Patented Feb. 19, 1935

1,991,726

UNITED STATES PATENT OFFICE 1,991,726

COMPOSITION OF MATTER

Otto Josef Boser, Radebeul, Germany, assignor to Chemische Fabrik von Heyden, A. G., Radebeul, near Dresden, Germany, a corporation of Germany No Drawing. Application December 20, 1930, Serial No. 503,860. In Germany December 21, 1929

6 Claims. (Cl. 99—11)

This invention relates to a composition of matter and it particularly relates to compositions of matter containing disinfecting agents, or which contain substances of pleasant taste so as to create a refreshing, stimulating sensation, for instance when they are chewed.

Such a refreshing sensation was effected in the prior art by the addition of peppermint oil and similar highly odorous, etherial substances to the compositions here in question. But I have discovered that such compositions are easier to chew, that they offer a greater surface to the tissues or membranes of the mouth, and that, without an odor, they stimulate and they sterilize the mouth, if substances are admixed to them which develop a gas after contact with the moisture of the mouth.

Such an object might be carried into effect by incorporating in the caoutchouc of a chewing gum substances like colloidal clay, chalk, infusorial earth. But the admixture of the aforesaid and similar substances "loosens the nerve" of the caoutchouc, i. e. it destroys the elastic properties.

Moreover, such admixing and the preparation of a chewing gum material in general requires kneading of the mixture in costly special machinery of very rugged construction; and the kneading must be continued for a very long time, which again increases the cost of manufacture.

It has been another object of this invention to prepare a chewing gum which liberates a gas, without impairing the life inherent to the gum.

It is also an object of this invention to avoid the use of machinery and to replace the costly mechanical process by a chemical method of producing mixtures of various natural gums, particularly Hevea Crepes, with other substances. By such a method I can mix the ingredients better and at less cost than with machinery, this chemical method being based on causing the gum to dissolve in a suitable agent to bring it into a quasi-liquid state. The ingredients to be embodied in the mixture may be added either before or after the solvent, or swelling agent, has been distilled off.

By my new chemical method of preparing the gum, I can control and reduce the toughness or stickiness of the mass to any desired degree. This is very important, since the liberation of the gases largely depends upon and is related to the toughness or stickiness of the mass. If the mass is too tough or sticky, the liberated gases may not produce the desired effect.

Continuing the treatment of the caoutchouc, or gum, I add vegetable gums, resins, waxes and similar substances, also sugar, pharmaceutical preparations, and substances for improving the taste.

In pursuance of my first-mentioned object, I may now introduce, in the form of a very fine powder, substances which upon contact with water generate a gas, for instance sodium bicarbonate and tartaric acid for the generation of carbon dioxide gas, or a persulfate, percarbonate, perborate, or other suitable per-compounds, for the generation of oxygen.

Instead of a mixture of sodium bicarbonate and tartaric acid, any other mixture may be applied, which by interaction furnishes carbondioxide or other gases, for instance mixtures of sodium bicarbonate with other acids, or of other substances, such as magnesium carbonate with citric acid; this last mixture combines the stimulating effect of the carbonic acid, the laxative effect of the magnesium, and,—if an excess of magnesium carbonate is applied,—the abrasive effect of the fine particles of the magnesium carbonate powder.

In case the composition of matter contains medicinal compounds, they are more easily absorbed and readily react with the membranes or tissue of the mouth since the surface of the chewed mass is considerably increased due to the development of gas.

For the better understanding of my invention I shall describe by various examples how I may proceed in operating the same:

Example 1

| | Parts |
|---|---|
| Hevea Crepes | 12 |
| Chicle | 20 |
| Wax, ceresin, or similar material | 3 | are thoroughly mixed and introduced into a solvent or swelling agent, for instance benzol or other hydrocarbons, and the whole mass is allowed to stand for several days in order to dissolve or swell. Further ingredients may be added to the mass, thus obtained, and are readily distributed therein by agitation.

Thus I may introduce into the reaction product sugar, cocoa, pharmaceutical compounds, and also ingredients for correcting the taste. Then I remove the solvent or swelling agent, by distillation. The ingredients for the correction of the taste may be introduced after distillation, instead of before.

Example 2

I first thoroughly mix together

| | Parts |
|---|---|
| Hevea Crepes | 60 |
| Chicle gum | 160 |
| Pure wax | 50 | allow the mixture to stand for several days in a sufficient quantity of benzol, and, to the solution thus obtained, I add 260 parts of powdered sugar, then 300 to 500 parts of a substance, or mixture of substances, capable of developing a gas when in contact with water; if that gas is to be carbon dioxide I may add either (a) equal parts of sodium bicarbonate and tartaric acid, or (b) 150 parts of sodium bicarbonate and 350 parts of sodium biphosphate, or (c) 100 parts of magnesium carbonate and 200 parts of citric acid.

I may also add substances giving a pleasant taste, or having therapeutic value.

What I claim is:

1. A soft pliable composition of matter giving upon mastication a pleasant and refreshing stimulating feeling, said composition comprising an intimate mixture of a chewing gum base and finely powdered, dry material yielding carbon dioxide in the presence of water and transforming said base into a sponge-like mass.

2. A soft pliable composition of matter giving upon mastication a pleasant and refreshing stimulating feeling, said composition comprising an intimate mixture of a chewing gum base and finely powdered dry metal carbonate and a solid acid capable of acting upon the carbonate in the presence of the moisture of the mouth, thereby generating carbon dioxide gas and transforming the base into a sponge-like mass.

3. A soft pliable composition of matter giving upon mastication a pleasant and refreshing stimulating feeling, said composition comprising an intimate mixture of a chewing gum base, and finely powdered sodium bicarbonate and tartaric acid in dry form, the interaction between said dry substances generating sufficient quantities of carbon dioxide to transform said base into a sponge-like mass.

4. A soft pliable composition of matter giving upon mastication a pleasant and refreshing stimulating feeling, said composition comprising an intimate mixture of a chewing gum base and finely powdered dry sodium bicarbonate and dry sodium biphosphate, the interaction between said dry substances generating sufficient quantities of carbon dioxide to transform said base into a sponge-like mass.

5. A soft pliable composition of matter giving upon mastication a pleasant and refreshing stimulating feeling, said composition comprising an intimate mixture of a chewing gum base and finely powdered dry magnesium carbonate and dry citric acid, the interaction between said dry substances generating sufficient quantities of carbon dioxide to transform the base into a sponge-like mass.

6. A soft pliable composition of matter giving upon mastication a pleasant and refreshing stimulating feeling, said composition comprising an intimate mixture of a chewing gum base and finely powdered dry magnesium carbonate and dry citric acid, the magnesium carbonate being slightly in excess and easily accessible during mastication to the moisture of the mouth.

OTTO JOSEF BOSER.